(12) United States Patent
Bandini et al.

(10) Patent No.: US 11,148,924 B2
(45) Date of Patent: Oct. 19, 2021

(54) FILLING VALVE AND FILLING MACHINE FOR FILLING RECEPTACLES

(71) Applicant: SIDEL PARTICIPATIONS, Octeville-sur-Mer (FR)

(72) Inventors: Filippo Bandini, Parma (IT); Stefano d'Errico, Parma (IT)

(73) Assignee: SIDEL PARTICIPATIONS, Octeville-sur-mer (FR)

( * ) Notice: Subject to any disclaimer, the term of this patent is extended or adjusted under 35 U.S.C. 154(b) by 141 days.

(21) Appl. No.: 16/426,015

(22) Filed: May 30, 2019

(65) Prior Publication Data

US 2019/0375621 A1 Dec. 12, 2019

(30) Foreign Application Priority Data

Jun. 11, 2018 (EP) .................................... 18305707

(51) Int. Cl.
*B67C 3/28* (2006.01)
*B67C 3/24* (2006.01)
(Continued)

(52) U.S. Cl.
CPC ............ *B67C 3/286* (2013.01); *B65B 39/004* (2013.01); *B67C 3/22* (2013.01); *B67C 3/24* (2013.01);
(Continued)

(58) Field of Classification Search
CPC .. B67C 3/286; B67C 3/24; B67C 3/26; B67C 3/22; B67C 3/28; B65B 39/004; B67D 3/0041; F16K 3/26; F16K 31/0644
See application file for complete search history.

(56) References Cited

U.S. PATENT DOCUMENTS 3,774,655 A * 11/1973 Trusselle ................... B67C 3/16
  141/46
6,817,386 B2 * 11/2004 Tsukano .................... B67C 3/04
  141/57
(Continued)

FOREIGN PATENT DOCUMENTS

EP  2 690 332 A1  1/2014
EP  3 165 500 A1  5/2017
(Continued)

OTHER PUBLICATIONS

European Search Report from corresponding EP Application No. 18305707.4 dated Jan. 21, 2019 (5 pages).

*Primary Examiner* — Jessica Cahill
*Assistant Examiner* — Patrick C Williams

(57) ABSTRACT

There is described a filling valve (5) for a filling machine (1) configured to fill a receptacle (2) and comprising a flow channel (11), having a first passage section (15) configured to be fluidly connected with the receptacle (2), and at least one shutter (22) movably arranged within the flow channel (11) and configured to be controlled, during a first operating mode in which the flow channel (11) is fed with a first pourable product, in: a resting position, in which it defines a first maximum opening passage for the first pourable product; a closing position, in which it is configured to sealingly cooperate with the first passage section (15) so as to prevent any fluidic connection between this latter and the receptacle (2); and at least one intermediate position, in which it defines a respective intermediate opening passage, so as to allow a partial flow rate of the first pourable product towards said receptacle; the flow channel (11) has a second passage section (18) configured to be fluidly connected with the first passage section (15) and with the receptacle (2); the shutter (22) is configured to be further controlled, during a second operating mode in which the flow channel (11) is fed (Continued)

with a second pourable product having solid particles in suspension, in: the resting position, in which it defines a second maximum opening passage for the second pourable product; and a partial closing position, in which it defines a restricted passage for the second pourable product.

20 Claims, 3 Drawing Sheets

(51) Int. Cl.
    *B67C 3/26*     (2006.01)
    *B67C 3/22*     (2006.01)
    *B65B 39/00*     (2006.01)
    *B67D 3/00*     (2006.01)
    *F16K 3/26*     (2006.01)
    *F16K 31/06*     (2006.01)

(52) U.S. Cl.
    CPC .................. *B67C 3/26* (2013.01); *B67C 3/28* (2013.01); *B67D 3/0041* (2013.01); *F16K 3/26* (2013.01); *F16K 31/0644* (2013.01)

(56) References Cited

U.S. PATENT DOCUMENTS

| 2009/0293985 | A1* | 12/2009 | Till | B67C 3/26 |
| | | | | 141/1 |
| 2010/0071803 | A1* | 3/2010 | Clusserath | B67C 3/04 |
| | | | | 141/65 |
| 2013/0112719 | A1* | 5/2013 | Huitorel | B67C 3/28 |
| | | | | 222/559 |
| 2014/0239209 | A1* | 8/2014 | Bandini | B67D 3/0041 |
| | | | | 251/65 |

FOREIGN PATENT DOCUMENTS

| WO | WO 2013/057694 A1 | 4/2013 |
| WO | WO 2013/057694 A9 | 8/2013 |

* cited by examiner

FILLING VALVE AND FILLING MACHINE FOR FILLING RECEPTACLES

CROSS-REFERENCE TO RELATED PATENT APPLICATIONS

This application claims the benefit of European Application No. 18305707.4, filed Jun. 11, 2018. The entire contents of the above-referenced application is expressly incorporated herein by reference.

TECHNICAL FIELD

The present invention relates to a filling valve for a filling machine configured to fill receptacles with pourable products, in particular pourable food products such as water, carbonated beverages, or the like.

The present invention also relates to a filling machine comprising a plurality of filling valves for filling receptacles with pourable products, in particular pourable food products.

BACKGROUND ART

Rotary-type filling machines are known to comprise a carousel rotatable around a vertical axis, a reservoir containing the pourable product and a plurality of filling valves. In detail, such filling valves are peripherally carried by the carousel, are connected to the reservoir by means of respective ducts and are advanced by the carousel along a circumferential transfer path.

Each filling valve is configured to feed a predetermined volume of pourable product into one respective receptacle at a time, while being advanced along the transfer path due to the rotary motion imparted by the carousel.

Such filling machines usually comprise an inlet conveyor for feeding a succession of empty receptacles to the carousel and an outlet conveyor receiving the filled receptacles from the carousel and configured to feed the filled receptacles to further treatment devices.

A typical filling valve comprises:
 a longitudinal tubular body mounted on a peripheral portion of the carousel and internally defining a flow channel for feeding the pourable product into a respective empty receptacle arranged under the tubular body;
 at least one shutter, which engages the tubular body in a sliding manner and is movable along the flow channel so as to allow or prevent the outflow of the pourable product towards the respective receptacle; and
 actuator means configured to control the movement of the shutter within the flow channel.

In some known embodiments, the flow channel has a straight configuration presenting a longitudinal axis parallel to the carousel axis.

In other known embodiments, the flow channel has a curved configuration and comprises two or more straight portions fluidically connected to one another by respective curved portions.

Typically, the flow channel terminates, at a lower end portion thereof, with an outlet passage section configured to allow, in use, the outflow of the pourable product from the flow channel towards the respective receptacle to be filled.

It is known in the field the need to conveniently control the flow rate of the pourable product towards the receptacle, in order to: achieve foam reduction within the receptacle, obtain the desired volume of product within the receptacle and avoid possible splashes and spills of product outside the receptacle.

In particular, it is known to provide a fine regulation of the flow rate of the pourable product during the final moments of the filling of the receptacle.

For this purpose, a known solution is to control the shutter in a modulating manner, thereby obtaining such fine regulation of the flow rate of the pourable product towards the receptacle.

According to this solution, the shutter is movable within the flow channel in a plurality of intermediate positions ranging between a full closing position and a full opening position.

More specifically, the shutter delimits, together with a tapered-section portion of the flow channel, an annular opening passage having varying sizes in dependence of whether the shutter is controlled into the full opening position or into one of the intermediate positions. The opening passage is at its maximum when the shutter is controlled into the full opening position; in the latter condition, the flow rate of the pourable product is the highest possible (maximum flow rate).

Conversely, when the shutter is in a particular intermediate position it delimits, together with the tapered-section portion, corresponding intermediate annular opening passages with varying dimensions, so as to allow the pourable product to flow at an intermediate flow rate (lower than the maximum flow rate) towards and into the receptacle.

However, although providing a functionally valid method for controlling the flow rate of the pourable product towards the receptacles, the known filling valves are still open to further improvements, in particular as to expand the range of pourable products to which a fine regulation can be applied, including the pourable products having solid particles in suspension, without increasing the total number of components needed and avoiding long disassembling and assembling operations.

DISCLOSURE OF INVENTION

It is therefore an object of the present invention to provide a filling valve, which is designed to fulfill the above-mentioned need in a straightforward and low-cost manner.

This object is achieved by a filling valve as claimed in claim 1.

It is a further object of the present invention to provide a filling machine, which is designed to fulfill the above-mentioned need in a straightforward and low-cost manner.

This object is achieved by a filling machine according to claim 12.

BRIEF DESCRIPTION OF THE DRAWINGS

A non-limiting preferred embodiment of the present invention will be described by way of example with reference to the accompanying drawings, in which.

BEST MODE FOR CARRYING OUT THE INVENTION

Figure 1:
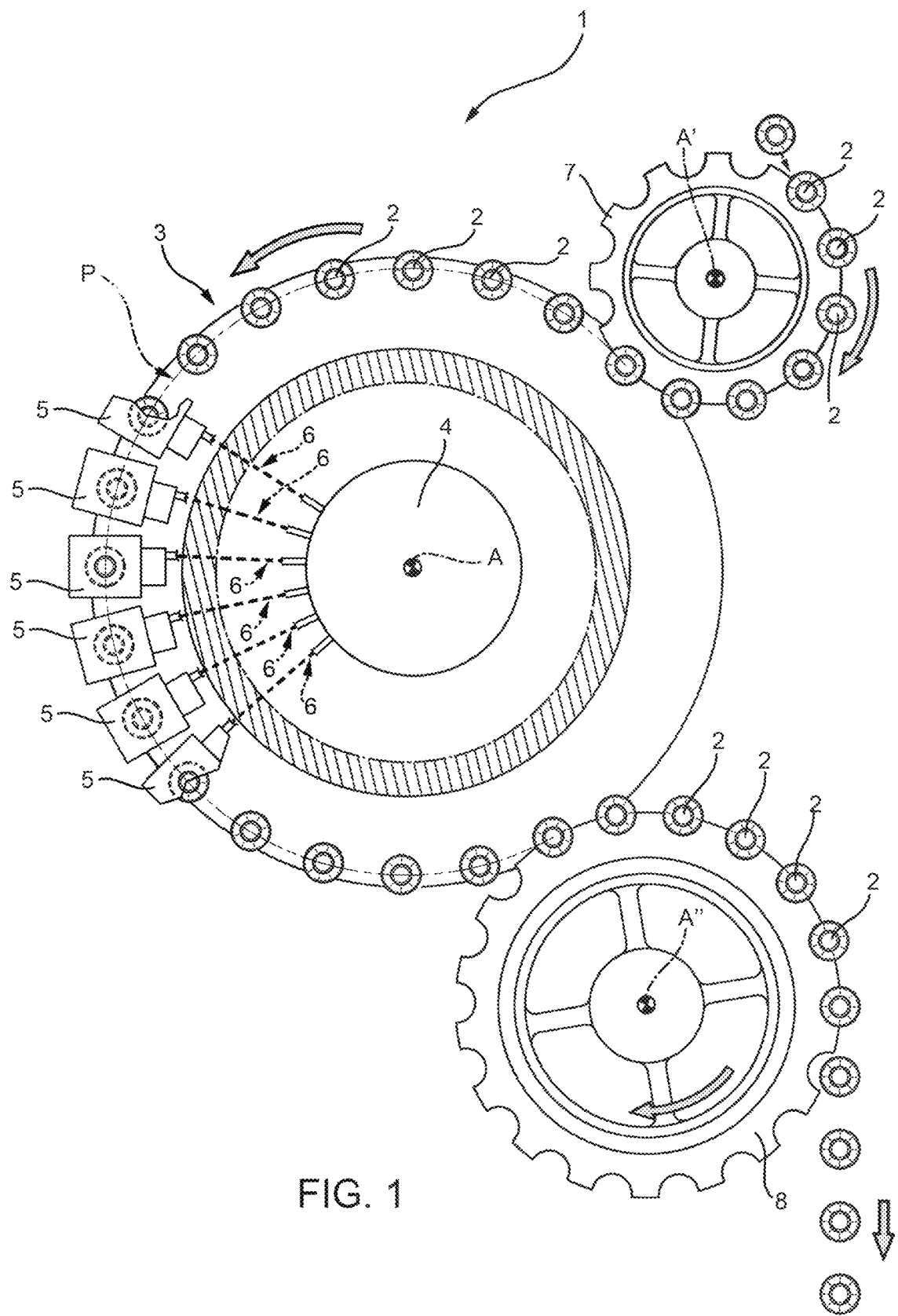
FIG. 1 is a schematic top view of a filling machine comprising a plurality of filling valves according to the teachings of the present invention.

With reference to FIG. 1, number 1 indicates as a whole a filling machine for filling a plurality of receptacles 2, such as bottles, containers and the like, with at least two different types of pourable products, preferably two different types of pourable food products, such as non-carbonated beverages (e.g. water, fruit juices, . . . ), carbonated beverages (e.g. sparkling water, soft drinks, beer, . . . ), or the like.

In particular, filling machine 1 is configured to operate at least in:
- a first operative mode, during which filling machine 1 operates a first pourable product, i.e. a fully liquid pourable product with no particles in suspension, and feeds such first pourable product into a plurality of receptacles 2; and
- a second operative mode, during which filling machine 1 operates a second pourable product having solid particles in suspension and feeds such second pourable product into a plurality of receptacles 2.

Filling machine 1 comprises:
- a conveying device, in particular a carousel 3 rotatable around a central axis A, preferably having a vertical orientation, and configured to advance receptacles 2 along an arc-shaped advancement path P;
- a reservoir 4 for containing the first or the second pourable product; and
- a plurality of filling valves 5, configured to fill receptacles 2 during their advancement along path P.

In detail, each filling valve 5 is configured to feed a predetermined volume of first or second pourable product into one receptacle 2 at a time, while the receptacle 2 is advanced along path P due to the rotary motion of carousel 3.

More specifically, each filling valve 5 is peripherally carried by carousel 3 and is fluidly connected to reservoir 4 by means of a respective duct 6 of filling machine 1.

As visible in FIG. 1, filling machine 1 further comprises an inlet conveyor, preferably a star wheel 7, adapted to feed a succession of empty receptacles 2 to carousel 3, and an outlet conveyor, preferably a star wheel 8, adapted to receive filled receptacles 2 from carousel 3.

In particular, star wheel 7 and star wheel 8 are rotatable around respective rotation axes A' and A", substantially parallel to axis A.

In the following, as filling valves 5 are identical to one another and for the sake of brevity, only one single filling valve 5 according to a non-limiting preferred embodiment of the present invention will be described.

However, all the features disclosed hereinafter for such filling valve 5 are applicable to each filling valve 5 of filling machine 1.

Figure 2:
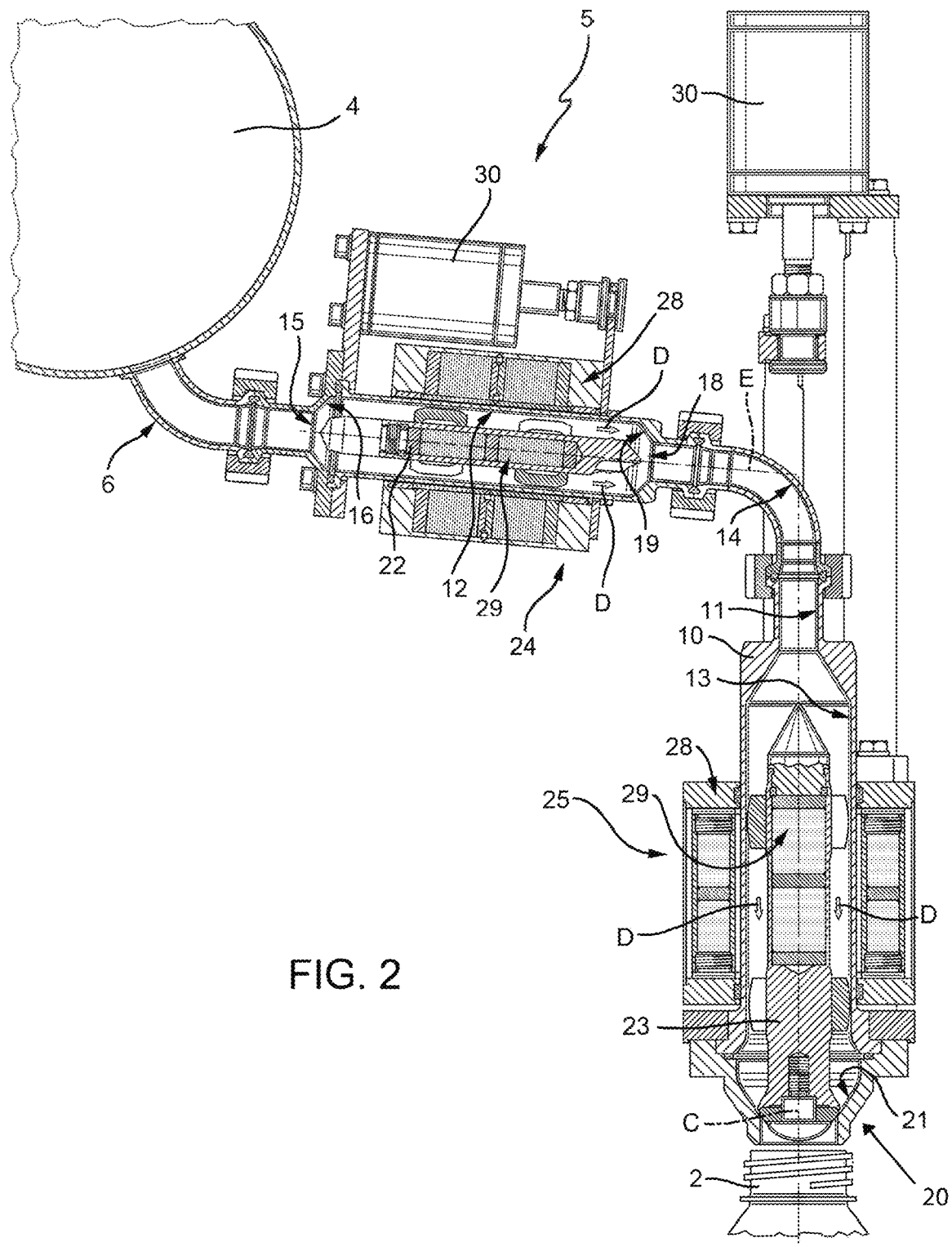
FIG. 2 is a partially sectioned side view of a filling valve according to a preferred embodiment of the present invention, with parts removed for clarity.

With particular reference to FIG. 2, the receptacle 2 is arranged, during the filling operation, below filling valve 5.

In the preferred embodiment shown, filling valve 5 is configured to operate in a non-contact mode.

In an alternative embodiment not shown, filling valve 5 could be configured to operate in the contact mode, i.e. in use, filling valve 5 establishes contact with a top neck portion of receptacles 2.

Filling valve 5 substantially comprises a valve body, in particular a tubular body 10, mounted on a peripheral portion of carousel 3 and internally defining a flow channel 11 configured to selectively feed the first or the second pourable product, along a flow direction D, into receptacle 2.

In particular, flow channel 11 is delimited by a respective inner wall, in particular an inner tubular wall of tubular body 10, which has a variable, substantially circular cross section and presents a curved configuration.

In detail, flow channel 11 comprises a first tubular portion 12, extending along an inclined axis E, and a second tubular portion 13, extending along a longitudinal axis C, preferably vertical and parallel to axis A of carousel 3. In particular, axis E is preferably inclined with respect to axis C. Preferably, axes C and E form an angle comprised between 90° and 180°.

In greater detail, first portion 12 is fluidly connected to second portion 13 by means of a curved tubular portion 14 arranged downstream of first portion 12 and upstream of second portion 13, with respect to flow direction D.

Furthermore, first portion 12 is also connected to the reservoir 4, in particular by means of the duct 6.

In other words, the first and the second pourable products are selectively fed from reservoir 4 to flow channel 11 through duct 6. Once inside flow channel 11, such pourable products flow through first portion 12, then through curved portion 14 and eventually through second portion 13, after which they reach and fill receptacle 2.

As visible in FIG. 2, flow channel 11 comprises a first passage section 15 configured to be fluidly connected with duct 6 and with receptacle 2.

In detail, first passage section is an (axial) inlet passage section for first portion 12.

In greater detail, first portion 12 comprises an engagement portion, in particular a tapered-section portion 16 narrowing in the direction of first passage section 15.

In light of the above, first passage section 15 defines a narrowed section of flow channel 11.

Flow channel 11 further comprises a second passage section 18 configured to be fluidly connected to first passage section 15 and to receptacle 2.

In detail, second passage section 18 is an (axial) outlet passage section for first portion 12.

In greater detail, first portion 12 comprises a further engagement portion, in particular a further tapered-section portion 19 narrowing in the direction of second passage section 18.

In light of the above, also second passage section 18 defines a narrowed section of flow channel 11.

In particular, second passage section 18 is arranged downstream of first passage section 15, with respect to flow direction D.

Furthermore, flow channel 11 comprises a third passage section 20 configured to be fluidly connected with first passage section 15, second passage section 18 and receptacle 2.

In detail, third passage section 20 is an (axial) outlet passage section for second portion 13.

In greater detail, second portion 13 comprises an engagement portion, in particular a tapered-section portion 21 narrowing in the direction of third passage section 20.

In light of the above, also third passage section 20 defines a narrowed section of flow channel 11, and is arranged downstream of second passage section 18, with respect to flow direction D.

As visible in FIG. 2, filling valve 5 further comprises:
- a first shutter 22 movably arranged within flow channel 11, in particular within first portion 12, and configured to be controlled so as to selectively regulate the flow rate of the first or the second pourable product towards receptacle 2;
- a second shutter 23 movably arranged within flow channel 11, in particular within second portion 13, and configured to be controlled so as to allow or prevent the outflow of the first or the second pourable product towards receptacle 2; and actuator means 24 and 25 configured to respectively control the movement of shutter 22 and shutter 23 within flow channel 11.

In particular, shutter 22 is arranged downstream of first passage section 15 and upstream of second passage section 18, whereas shutter 23 is arranged downstream of second passage section 18 and upstream of third passage section 20, with respect to flow direction D. Therefore, shutter 22 is arranged within flow channel 11 in a position upstream of shutter 23, with respect to flow direction D.

More in particular, shutter 22, first passage section 15 and second passage section 18 are coaxially arranged with respect to axis E.

Furthermore, shutter 23 and third passage section 20 are coaxially arranged with respect to axis C.

Figure 3A:
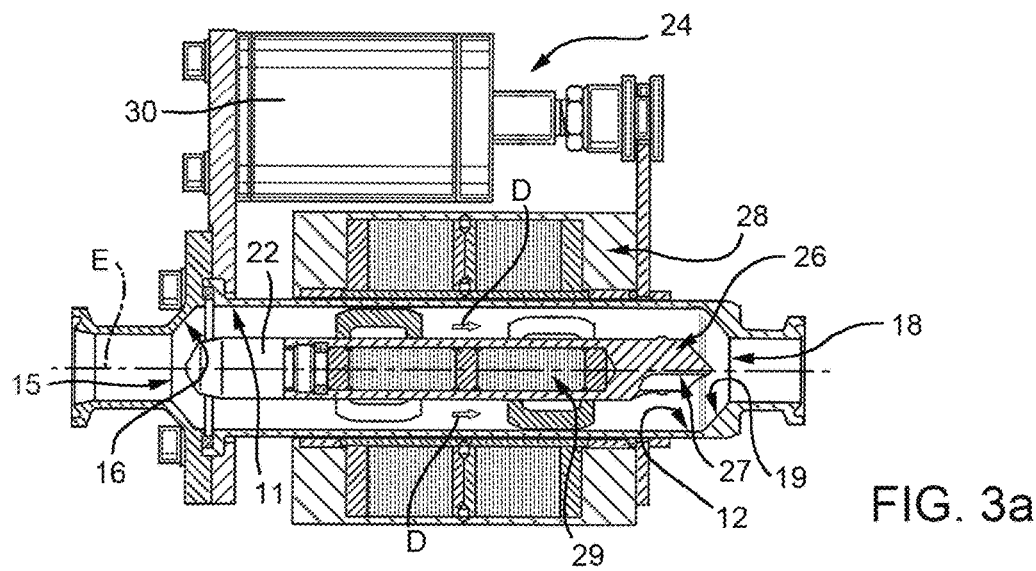
FIGS. 3*a*-3*c* are partially sectioned side views, with parts removed for clarity, of a particular of the filling valve of FIG. 2 during different operating conditions.
Figure 3B:
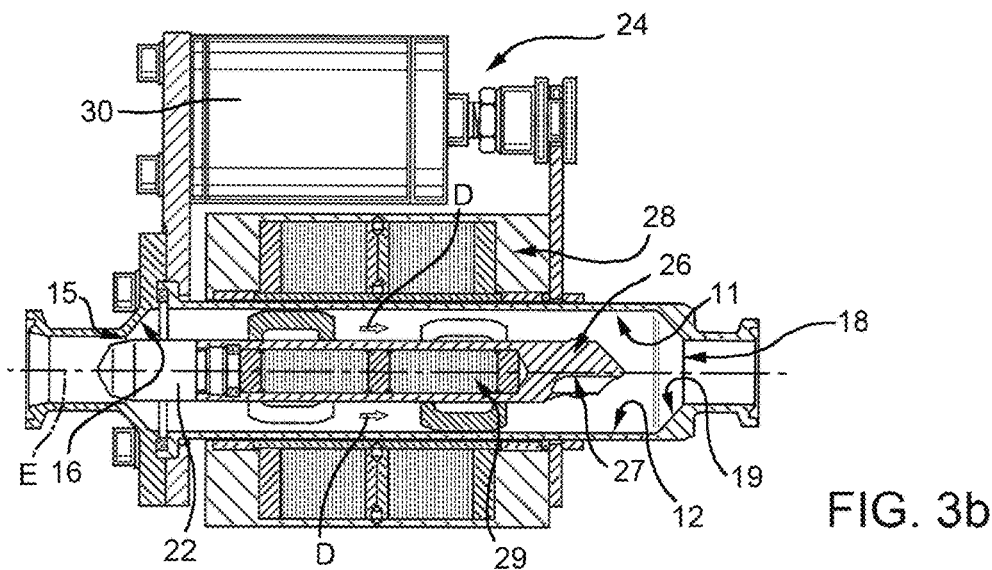

As shown in FIGS. 3*a* and 3*b*, shutter 22 is configured to be controlled, during the above-mentioned first operating mode in which flow channel 11 is fed with the first pourable product, in:
- a resting position (FIG. 3*a*), in which shutter 22 delimits, together with first passage section 15, in particular with tapered-section portion 16, a first maximum opening passage for the first pourable product, so as to allow a maximum flow rate of this product towards receptacle 2 and through the first maximum opening passage;
- a closing position (FIG. 3*b*), in which shutter 22 is configured to sealingly cooperate with first passage section 15, so as to prevent any fluidic connection between passage section 15 and receptacle 2; and in
- one or more intermediate positions (not shown), located between the resting and the closing positions, in which shutter 22 delimits, together with first passage section 15, in particular with tapered-section portion 16, respective intermediate opening passages for the first pourable product, so as to allow a partial flow rate of this product towards receptacle 2 and through the respective intermediate opening passages.

In particular, when shutter 22 is in the resting position, the flow rate of the first pourable product from first passage section 15 to second passage section 18 is the highest possible (maximum flow rate). When shutter 22 is in one of the intermediate positions, the intermediate opening passages, having different sizes, allow the first pourable product to flow from first passage section 15 to second passage section 18 at respective intermediate flow rates, being lower than the maximum flow rate. When shutter 22 is in the closing position, the first pourable product flow rate is null.

In light of the above, shutter 22 is configured to be controlled, during the first operating mode, in a modulating manner; i.e. shutter 22 is controlled between the resting position and the closing position so as to control the flow rate of the first pourable product between the maximum flow rate, the intermediate flow rates, and the null flow rate.

According to an important aspect of the present invention, shutter 22 is configured to be further controlled, during the above-mentioned second operating mode in which flow channel 11 is fed with the second pourable product, in:
- the above-mentioned resting position, in which shutter 22 further delimits, together with second passage section 18, in particular with tapered-section portion 19, a second maximum opening passage for the second pourable product, so as to allow a maximum flow rate of this second pourable product towards receptacle 2 and through the second maximum opening passage; and in
- a partial closing position (FIG. 3*c*), in which shutter 22 delimits, together with second passage section 18, in particular with the inner tubular wall of flow channel 11, a restricted passage for the second pourable product, so as to allow a partial flow rate of the second pourable product towards receptacle 2 and through the restricted passage.

In other words, shutter 22 is configured to be controlled, during the second operating mode, in an on/off manner, i.e. only in two different positions without any intermediate position therebetween.

In particular, shutter 22 comprises at least one interaction portion 26 configured to engage second passage section 18 and delimiting, together with the portion of flow channel 11 facing interaction portion 26, the above-mentioned restricted passage, when shutter 22 is in the partial closing position.

Figure 3C:
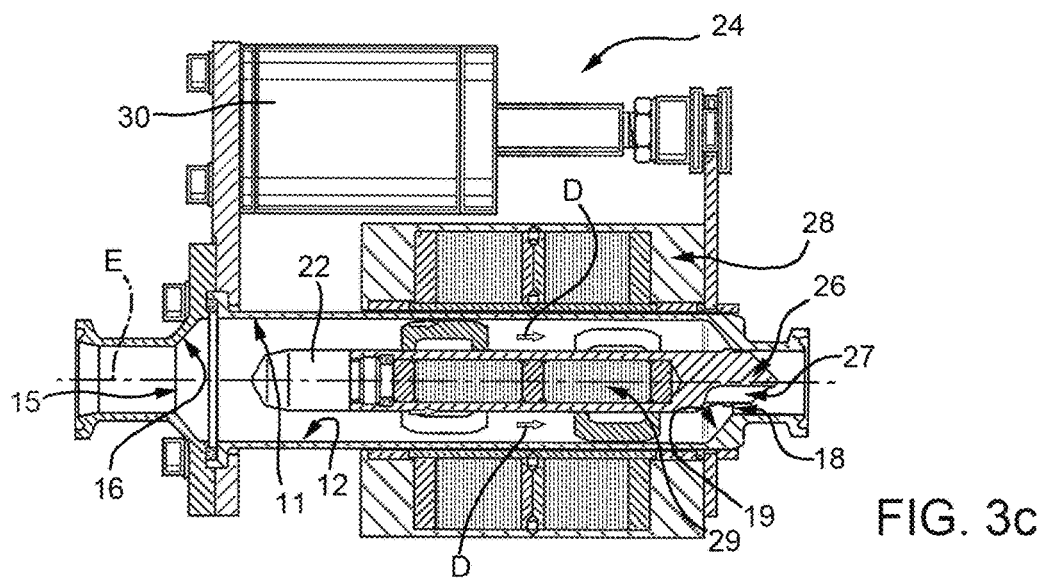

More specifically, interaction portion 26 comprises a groove 27, which defines the restricted passage for the second pourable product when shutter 22 is in the partial closing position, as shown in FIG. 3*c*.

In this preferred embodiment, groove 27 is asymmetric with respect to axis E, i.e. extends only on one side of interaction portion 26, with respect to axis E.

According to a possible alternative not shown, groove may be obtained circumferentially along the whole interaction portion 26, i.e. in an axial-symmetric manner.

In light of the above, when shutter 22 is in the partial closing position, only one lateral side of interaction portion 26, with respect to axis E, engages and cooperates in contact with second passage section 18, whereas the opposite lateral side, i.e. the side of interaction portion 26 where groove 27 is obtained, delimits with the inner wall of flow channel 11 the above-mentioned restricted passage for the second pourable product.

In other words, during the second operating mode, shutter 22 only regulates the flow, without blocking completely the flow of the second pourable product towards receptacle 2.

In fact, despite not having difficulties with clear, fully liquid pourable products, modulation is problematic to achieve with pourable products having solid particles in suspension, such as the second pourable product. In particular, when shutter 22 is in the above-described intermediate opening positions, especially in proximity to the closing position, the particles in suspension can concentrate and accumulate in correspondence of the relative narrow intermediate opening passage, thereby blocking the flow of such second pourable product towards receptacle 2.

With the above described configuration of shutter 22, an accumulation of solid particles can be avoided while regulating the flow rate of the second pourable product, thereby ensuring the desired regulated flow of such product towards receptacle 2, without any interruptions, jamming or slow-downs.

In light of the above, shutter 22 is configured to be selectively controlled between the resting position and the closing position during the first operating mode, and between the resting position and the partial closing position during the second operating mode.

According to this non-limiting preferred embodiment shown, shutter 22 is configured to be controlled from the resting position towards the closing position, i.e. during the first operating mode, in a direction against flow direction D.

Furthermore, shutter 22 is configured to be controlled, from the resting position towards the partial closing position, i.e. during the second operating mode, in a direction following (concurrent to) flow direction D.

According to this non-limiting preferred embodiment, shutter 23 is configured to be controlled in:
- a first (upper) position (not shown), in which shutter 23 delimits, together with third passage section 20, in particular with tapered-section portion 21, a third maximum opening passage for the first or second pourable product, so as to allow the flow of these products towards receptacle 2; and a second (lower) position (shown in FIG. 2), in which shutter 23 is configured to sealingly cooperate with third passage section 20, so as to prevent any flow of the first or second pourable product towards receptacle 2.

In light of the above, shutter 23 is configured to be controlled in an on/off manner (without any intermediate position therebetween).

In detail, shutter 23 is configured to be controlled towards the second position in a direction following flow direction D.

In the non-limiting embodiment shown, actuator means 24 and 25 are of the magnetic type.

This is advantageous, since it allows to easily maintain aseptic or ultra-clean conditions by providing for a proper separation between the inner aseptic environment of flow channel 11 and the external non-sterile environment. In the preferred embodiment, no mechanical interfaces enter into the inner aseptic environment of flow channel 11, thereby facilitating the maintenance of the aseptic or ultra-clean conditions.

Since the features of actuator means 24 are identical to the features of actuator means 25, only actuator means 24 will be described in the following, for the sake of brevity.

However, all the features disclosed hereinafter for actuator means 24 are applicable to actuator means 25.

In detail, actuator means 24 comprise a driving magnetic assembly 28, arranged externally around flow channel 11, and a driven magnetic assembly 29, arranged within flow channel 11 and comprised in at least a portion of shutter 22, and preferably being made of a ferromagnetic material, or provided with permanent magnets.

In greater detail, assembly 29 comprises at least one permanent magnet included within shutter 22, two in this preferred embodiment.

According to a further possible alternative not shown, shutter 22 could be entirely made in ferromagnetic material, thereby entirely defining assembly 29.

In particular, assembly 28 is configured to move parallel to axis E by means of a linear actuator, such as e.g. a stepper motor 30, this latter being preferably arranged on one lateral side of tubular body 10, preferably on one lateral side of first portion 12.

Assembly 28 is configured to be magnetically coupled to assembly 29, so as to control the movement of shutter 22 between the resting position and the closing position, during the first operating condition, and between the resting position and the partial closing position, during the second operating condition.

In practice, as assembly 28 is moved by means of stepper motor 30, assembly 29 moves due to the magnetic interaction with assembly 28, thereby causing shutter 22 to move within flow channel 11 without any mechanical coupling.

As visible in FIG. 2, actuator means 25 are substantially identical to actuator means 24, with the only differences that: the assembly 28 of actuator means 25 is configured to move parallel to axis C, the assembly 29 is comprised in shutter 23, and the stepper motor 30 is arranged in a position above second portion 13.

The operation of filling valve 5 is described hereinafter with reference to a single empty receptacle 2 to be filled and placed below filling valve 5.

In particular, the first or the second pourable product are selectively fed to flow channel 11 from reservoir 4, through ducts 6 and first passage section 15.

Then, during the first operating condition, the flow rate of the first pourable product is regulated by controlling shutter 22 from the resting position towards the closing position.

Conversely, during the second operating condition, the flow rate of the second pourable product is regulated by controlling shutter 22 from the resting position towards the partial closing position.

Once the first or the second pourable product has passed through second passage section 18, the flow is allowed towards receptacle 2 by controlling shutter 23 in the first position.

Then, when the level of the first or second pourable product inside receptacle 2 reaches or approaches the desired level, shutter 23 is controlled so as to immediately move into the second position, thereby preventing any further amount of first or second pourable product to flow through third passage section 20. In this way, receptacle 2 can be filled with the exact desired amount of pourable product.

The entire operation is repeated cyclically for each filling valve 5 and for each receptacle 2 to be filled, either in the first operating condition or in the second operating condition.

The advantages of filling valve 5 according to the present invention will be clear from the foregoing description.

In particular, due to the configuration of shutter 22 according to the present invention, a regulation of the flow rate of pourable products having solid particles in suspension can be achieved without the need for further valves or shutters.

In this way, the range of pourable products to which a fine regulation can be applied using only a single valve can be expanded, without increasing the total number of components needed, and avoiding long disassembling and assembling operations.

Clearly, changes may be made to filling valve 5 as described herein without, however, departing from the scope of protection as defined in the accompanying claims.

The invention claimed is:

1. A filling valve for a filling machine configured to fill a receptacle, the filling valve comprising; a flow channel having:
   a first passage section configured to be fluidly connected with the receptacle;
   a second passage section configured to be fluidly connected with the first passage section and with the receptacle; and
   at least one shutter movably arranged within the flow channel,
wherein, during a first operating mode in which the flow channel is fed with a first pourable product, the shutter is configured to be controlled between at least:
   a resting position, in which the shutter defines, together with the first passage section, a first opening passage for the first pourable product, so as to allow a first flow rate of the first pourable product towards the receptacle and through the first opening passage;
   a closing position, in which the shutter is configured to sealingly cooperate with the first passage section, so as to prevent fluidic connection between the first passage section and the receptacle; and
   at least one intermediate position, located between the resting position and the closing position, in which the shutter defines, together with the first passage section, an intermediate opening passage, so as to allow a second flow rate of the first pourable product, which is lower than the first flow rate, towards the receptacle and through the intermediate opening passage, and wherein, during a second operating mode in which the flow channel is fed with a second pourable product different from the first pourable product and having solid particles, the shutter is configured to be controlled between at least:

the resting position, in which the shutter further defines, together with the second passage section, a second opening passage for the second pourable product, so as to allow a first flow rate of the second pourable product towards the receptacle and through the second opening passage; and a partial closing position, in which the shutter defines, together with the second passage section, a restricted passage for the second pourable product, so as to allow a second flow rate of the second pourable product, which is less than the first flow rate of the second pourable product, towards the receptacle and through the restricted passage.

2. The filling valve as claimed in claim 1, wherein the shutter comprises at least one interaction portion configured to engage the second passage section and defining, together with the second passage section, the restricted passage, when the shutter is in the partial closing position.

3. The filling valve as claimed in claim 2, wherein the interaction portion comprises a groove) defining the restricted passage for the second pourable product, when the shutter is in the partial closing position.

4. The filling valve as claimed in claim 1, wherein the first passage section is arranged upstream of the second passage section, with respect to a flow direction of the first pourable product and the second pourable product within the flow channel; and the shutter being arranged downstream of the first passage section and upstream the second passage section, with respect to the flow direction.

5. The filling valve as claimed in claim 4, wherein the shutter is configured to be controlled from the resting position towards the closing position in a direction against the flow direction.

6. The filling valve as claimed in claim 5, wherein the shutter is configured to be controlled from the resting position towards the partial closing position in a direction following the flow direction.

7. The filling valve as claimed in claim 4, wherein the flow channel further comprises a third passage section configured to be fluidly connected with the first passage section, with the second passage section and with the receptacle; the filling valve further comprising an auxiliary shutter, movably arranged within the flow channel and configured to be controlled between at least:

a first position, in which the auxiliary shutter defines, together with the third passage section, a third opening passage, so as to allow the flow of the first or second pourable product towards the receptacle and through the third opening passage; and a second position, in which the auxiliary shutter is configured to sealingly cooperate with the third passage section, so as to prevent flow of the first or second pourable product towards the receptacle.

8. The filling valve as claimed in claim 7, wherein the auxiliary shutter is arranged downstream of the second passage section and upstream of the third passage section, with respect to the flow direction.

9. The filling valve as claimed in claim 7, wherein the first and second passage sections have a first longitudinal axis, and the third passage section has a second longitudinal axis, and wherein the first and second longitudinal axes form an angle between 90° and 180°.

10. The filling valve as claimed in claim 1, wherein the shutter is configured to be controlled in a modulating manner between the resting position and the closing position; and the shutter being configured to be controlled in an on/off manner between the resting position and the partial closing position.

11. The filling valve as claimed in claim 1, comprising a magnetic actuator configured to control the shutter between the resting position and the closing position and between the resting position and the partial closing position.

12. A filling machine for filling a plurality of receptacles; the filling machine comprising a plurality of filling valves according to claim 1.

13. The filling machine as claimed in claim 12, further comprising a carousel rotatable around a central axis, being configured to advance the receptacles along an advancement path and peripherally carrying the plurality of filling valves;

wherein each one of the plurality of filling valves is configured to fill one respective receptacle at a time during its advancement along the advancement path.

14. A method of using a filling valve as claimed in claim 1, in:

the first operating mode, during which the first pourable product is fed to the flow channel; and the second operating mode, during which the second pourable product is fed to the flow channel;

the first pourable product being a fully liquid pourable product and the second pourable product having solid particles.

15. A method of controlling a filling valve for a filling machine configured to fill a receptacle, the filling valve including a flow channel having a first passage section configured to be fluidly connected with the receptacle, a second passage section configured to be fluidly connected with the first passage section and with the receptacle, and at least one shutter movably arranged within the flow channel, the method comprising:

during a first operating mode in which the flow channel is fed with a first pourable product, controlling the shutter to be moved between at least:

a resting position, in which the shutter defines, together with the first passage section, a first opening passage for the first pourable product, so as to allow a first flow rate of the first pourable product towards the receptacle and through the first opening passage;

a closing position, in which the shutter is configured to sealingly cooperate with the first passage section, so as to prevent fluidic connection between the first passage section and the receptacle; and at least one intermediate position, located between the resting position and the closing position, in which the shutter defines, together with the first passage section, an intermediate opening passage, so as to allow a second flow rate of the first pourable product, which is lower than the first flow rate, towards the receptacle and through the intermediate opening passage, and during a second operating mode in which the flow channel is fed with a second pourable product different from the first pourable product and having solid particles, controlling the shutter to be moved between at least:

the resting position, in which the shutter further defines, together with the second passage section, a second opening passage for the second pourable product, so as to allow a first flow rate of the second pourable product towards the receptacle and through the second opening passage; and a partial closing position, in which the shutter defines, together with the second passage section, a restricted passage for the second pourable product, so as to allow a second flow rate of the second pourable product, which is less than the first flow rate of the second pourable product, towards the receptacle and through the restricted passage.

16. The method as claimed in claim 15, further comprising controlling the shutter to be moved from the resting position towards the closing position in a direction against a flow direction of the first pourable product and the second pourable product within the flow channel.

17. The method as claimed in claim 15, further comprising controlling the shutter to be moved from the resting position towards the partial closing position in a flow direction of the first pourable product and the second pourable product within the flow channel.

18. The method as claimed in claim 15, further comprising:

controlling the shutter in a modulating manner between the resting position and the closing position; and controlling the shutter in an on/off manner between the resting position and the partial closing position.

19. The method as claimed in claim 15, further comprising magnetically actuating the shutter to cause the shutter to move between the resting position and the closing position and between the resting position and the partial closing position.

20. The method as claimed in claim 15, wherein the flow channel further comprises a third passage section configured to be fluidly connected with the first passage section, with the second passage section and with the receptacle; the filling valve further comprising an auxiliary shutter, movably arranged within the flow channel, the method further comprising:

controlling the auxiliary shutter to be moved between at least:

a first position, in which the auxiliary shutter defines, together with the third passage section, a third opening passage, so as to allow the flow of the first or second pourable product towards the receptacle and through the third opening passage; and a second position, in which the auxiliary shutter is configured to sealingly cooperate with the third passage section, so as to prevent flow of the first or second pourable product towards the receptacle.

* * * * *